US011202692B1

(12) United States Patent  (10) Patent No.: US 11,202,692 B1
Alqahtani  (45) Date of Patent: Dec. 21, 2021

(54) HAMAD BI-SLOT ORTHODONTIC BRACKET

(71) Applicant: King Abdulaziz University, Jeddah (SA)

(72) Inventor: Hamad Saeed Alqahtani, Jeddah (SA)

(73) Assignee: KING ABDULAZIZ UNIVERSITY, Jeddah (SA)

( * ) Notice: Subject to any disclaimer, the term of this patent is extended or adjusted under 35 U.S.C. 154(b) by 0 days.

(21) Appl. No.: 17/106,820

(22) Filed: Nov. 30, 2020

(51) Int. Cl.
*A61C 7/14* (2006.01)
*A61C 7/16* (2006.01)

(52) U.S. Cl.
CPC .............. *A61C 7/143* (2013.01); *A61C 7/146* (2013.01); *A61C 7/16* (2013.01)

(58) Field of Classification Search
CPC .. A61C 7/12; A61C 7/125; A61C 7/14; A61C 7/141; A61C 7/143; A61C 7/145; A61C 7/146; A61C 7/148; A61C 7/16; A61C 7/18; A61C 7/28; A61C 7/285
USPC ...................................... 433/8, 9, 10, 11, 16
See application file for complete search history.

(56) References Cited

U.S. PATENT DOCUMENTS

| | | | | |
|---|---|---|---|---|
| 4,219,617 A | * | 8/1980 | Wallshein | A61C 7/287 433/8 |
| 4,455,137 A | * | 6/1984 | Diamond | A61C 7/146 433/3 |
| 4,597,739 A | * | 7/1986 | Rosenberg | A61C 7/14 433/16 |
| 4,674,978 A | * | 6/1987 | Acevedo | A61C 7/143 433/8 |
| 4,793,804 A | * | 12/1988 | Schudy | A61C 7/12 433/8 |
| 6,739,869 B1 | * | 5/2004 | Taub | A61C 7/00 433/24 |
| 7,234,935 B2 | | 6/2007 | Abels et al. | |
| 7,306,458 B1 | * | 12/2007 | Lu | A61C 7/14 433/16 |
| 8,366,440 B2 | | 2/2013 | Bathen et al. | |
| RE45,904 E | | 3/2016 | Rudman | |
| 9,408,676 B2 | * | 8/2016 | Rahimi | A61C 7/16 |
| 9,993,314 B2 | | 6/2018 | Diamant | |
| 10,682,207 B2 | | 6/2020 | Dupray et al. | |
| 2011/0014583 A1 | * | 1/2011 | Romano | A61C 7/28 433/10 |
| 2012/0156632 A1 | * | 6/2012 | Schiller | A61C 19/063 433/10 |
| 2012/0237887 A1 | * | 9/2012 | Mashouf | A61C 7/023 433/10 |
| 2013/0309625 A1 | | 11/2013 | Macchi et al. | |
| 2014/0272749 A1 | * | 9/2014 | Yick | A61C 7/14 433/8 |

(Continued)

OTHER PUBLICATIONS

Cozzani et al., "Uses of the Vertical Slot in Orthodontic Brackets", JCO, Sep. 2015, vol. XLIX No. 9.

(Continued)

*Primary Examiner* — Matthew M Nelson
(74) *Attorney, Agent, or Firm* — W&C IP

(57) ABSTRACT

Orthodontic braces comprising rotatable versatile brackets are provided. Each rotatable bracket has two different slot sizes, and rotation of the whole bracket before its bonding to the tooth brings one or the other of the slot sizes into horizontal alignment so that different archwires corresponding to the selected size can be accommodated.

8 Claims, 6 Drawing Sheets

(56) References Cited

U.S. PATENT DOCUMENTS

2015/0182306 A1* 7/2015 Chen .................. A61C 7/143
433/9
2015/0342707 A1* 12/2015 Fernandez San Pablo ..................
A61C 7/287
433/9
2016/0199155 A1* 7/2016 Bosio .................. A61C 7/282
433/15

OTHER PUBLICATIONS

Karakussoglu, "The Design of an Adjustable Orthodontic Bracket", Masters Thesis, Loyola University Chicago, 1981.
Shen et al, "The effects of a newly designed twin-slot bracket on severely malpositioned teeth—a typodont experimental study", European Journal of Orthodontics 30 (2008) 401-406.

* cited by examiner

HAMAD BI-SLOT ORTHODONTIC BRACKET

BACKGROUND OF THE INVENTION

Field of the Invention

The invention generally relates to improved orthodontic brackets comprising rotatable brackets. In a particular embodiment of the invention, the rotatable brackets incorporate two different slot sizes in the same bracket, and the rotation of the whole bracket brings one or the other of the slot sizes into horizontal alignment so that different archwires corresponding to the selected slot size can be accommodated and secured in the selected slot.

Description of Related Art

Orthodontics is a dental specialty which aims at rearrangement of irregular teeth by gradually moving them into an appropriate position in relation to the surrounding facial structures. Irregular teeth can be straightened using orthodontic brackets and archwires.

Edgewise brackets are the most popular brackets. The term "edgewise" is used to describe an orthodontic bracket that has a rectangular archwire slot which can accommodate round, square or rectangular archwires horizontally. These brackets come in different designs and configurations. For example, Siamese twin brackets, a single bracket with rotation wings, and Tip-Edge brackets are known.

Orthodontic brackets include different parts and various arrangements of parts based on their particular design. Twin brackets usually have a slot that runs horizontally to accommodate orthodontic archwire. On both sides of this slot, two tie wings run vertically to provide means of ligating the archwire for retention. Elastomeric rings or stainless-steel ligature rings are typically used to ligate the archwire ligation into a slot.

Orthodontic brackets are usually classified based on different features. Slot size is one of them. Based on slot size, brackets slot dimension can be either 0.022 inches vertically and 0.028 inches horizontally, or 0.018 inches vertically and 0.028 inches horizontally. Each slot size has its own features and characteristics. The 0.018-inch bracket slots have the ability to control the torque of anterior teeth early in treatment and are easier to use for managing smaller, flexible finishing archwires in the late stages of orthodontic treatment. The 0.022-inch slots, which provide light forces during the early stages of treatment, allow more freedom of movement for the initial archwires. Later, in the late stages of treatment, heavier steel rectangular working wires can be used to provide less binding and deflection during space closure. Moreover, this large slot makes insertion of initial archwires easier and more accessible and allows less frictional binding and more choices in wire composition and size [1].

Orthodontists usually prefer one of these bracket systems or a combination of them. In the United Kingdom and United States, 0.022-inch bracket slots are preferred by the majority of practitioners. 0.018-inch bracket slots are preferred in the rest of mainland Europe [2]. Unfortunately, problems arise when a patient having braces with a particular bracket size transfers from one area to another and seeks orthodontic care at a new office if the new office uses brackets with another slot size. Such variations in preferred slot sizes between offices increases the expense of continuing orthodontic treatment, since the wires or the braces have to be replaced. However, having multiple bracket sizes in the same office increases inventory and adds expenses to the practice.

Accordingly, there is a need for a bracket system that can provide the advantages of the two slot sizes in the same bracket at the same time without adding or increasing the cost or complicating a practice's inventory. In particular, it would be advantageous to have available an orthododontic bracket system which incorporates 0.018-inch and 0.022-inch slot sizes in the same bracket.

SUMMARY OF THE INVENTION

An "edgewise" orthodontic bracket which incorporates two slot sizes in the same bracket is provided. The two, differently sized slots are positioned at a 90° angle relative to each other on an outer surface of the bracket. The bracket is versatile, and a desired slot size is easily selected by rotating the whole bracket in a clockwise or counterclockwise direction before its bonding to the tooth surface. This is to bring the desired slot into a horizontal position (horizontal with respect to the occlusal plane). The desired slot size of brackets should be selected before the braces are applied to the teeth. In addition, clinicians can use any combination of sizes, based on their patients' needs.

Other features and advantages of the present invention will be set forth in the description of invention that follows, and in part will be apparent from the description or may be learned by practice of the invention. The invention will be realized and attained by the compositions and methods particularly pointed out in the written description and claims hereof.

It is an object of this invention to provide a rotatable versatile orthodontic bracket, comprising a bracket base; and a bracket face comprising a first archwire slot having a first vertical dimension and a second archwire slot having a second vertical dimension, wherein: the first archwire slot and the second archwire slot intersect at a 90° angle, the first vertical dimension and the second vertical dimension are different, and both slots have the same depth. In some aspects, the first vertical dimension is 0.018 inches and the second vertical dimension is 0.022 inches. In other aspects, the first archwire slot and the second archwire slot each have a horizontal dimension of 0.028 inches. In additional aspects, the rotatable versatile orthodontic bracket further comprises at least four tie-wings. In certain aspects, the four tie-wings are contoured. In further aspects, the rotatable versatile orthodontic bracket is made from metal, ceramic, or polymer.

The invention also provides a set of braces comprising at least one rotatable versatile orthodontic bracket as described herein.

Also provided is a method for adjusting a position of at least one tooth of a patient, comprising: i) selecting a slot size of the rotatable versatile orthodontic bracket as described herein for adjusting the position of the at least one tooth; ii) selection can be done by rotating the rotatable versatile orthodontic bracket of claim 1 to an orientation in which the desired slot is horizontal with respect to the occlusal plane; iii) adhering the bracket base to the at least one tooth of the patient, wherein the orientation is maintained during the step of adhering; iv) selecting an archwire or different archwires having a size corresponds to the selected slot size; and v) securing the archwire in the slot. In some aspects, steps i)-v) are performed a plurality of times for a plurality of teeth of the patient.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

An edgewise orthodontic bracket which incorporates two slot sizes in the same bracket is provided.

Definitions: As used herein, an archwire slot refers to the channel or groove present on an outer surface of a bracket, the slot being of a size so as to accommodate (receive and hold in place, retain, etc.) an archwire.

The Brackets

The brackets disclosed herein generally comprise a bracket base, which attaches directly to a tooth, and a bracket face, which has both slots and 4 wings. The whole bracket system can be bonded to the tooth structure in different orientations to select the appropriate slot size. Overall, the bracket may have a substantially rectangular (e.g. square) shape where the gingival and occlusal sides are parallel, the mesial and distal sides are parallel, and a substantially right angle is formed by adjacent non-parallel sides.

The underside of the bracket base that directly contacts a tooth has a mesh-like or micro-etched pattern, the relief of the pattern providing additional depth or space close to the tooth surface so that a slightly thicker coating of bonding agent can be applied in those areas to hold the base onto a tooth.

Figure 1A:
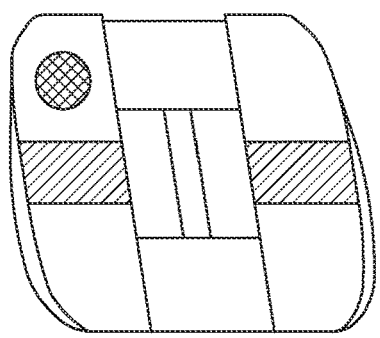
FIG. 1A-E. Showing the difference between the present Hamad bi-slot bracket and conventional orthodontic bracket. A, conventional bracket; B, different views of Hamad bi-slot bracket; C, presents different components of the bracket; D, presents bracket with 0.022" size slot orientation; E, presents bracket after a 90° rotation to a second position 0.018" size slot orientation.
Figure 1B:
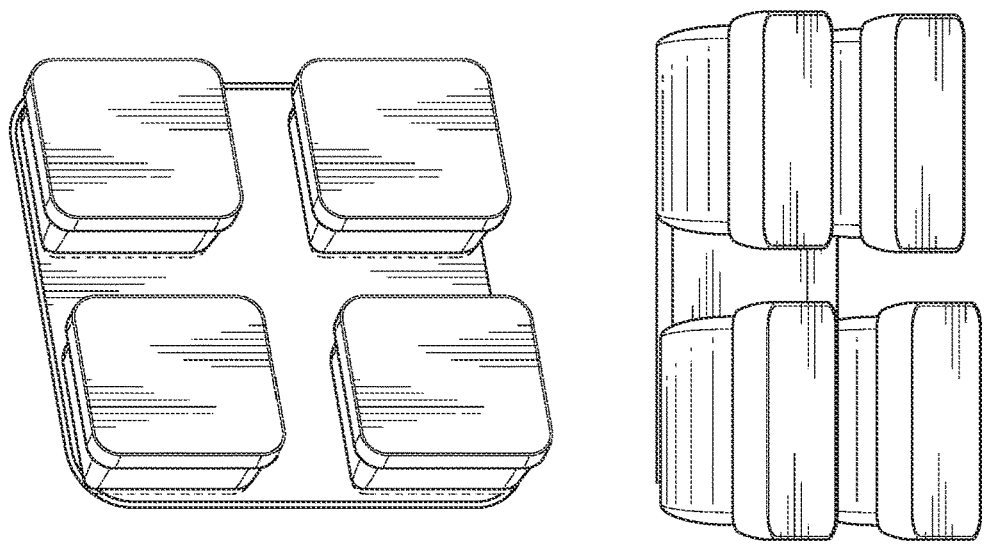
Figure 1B:
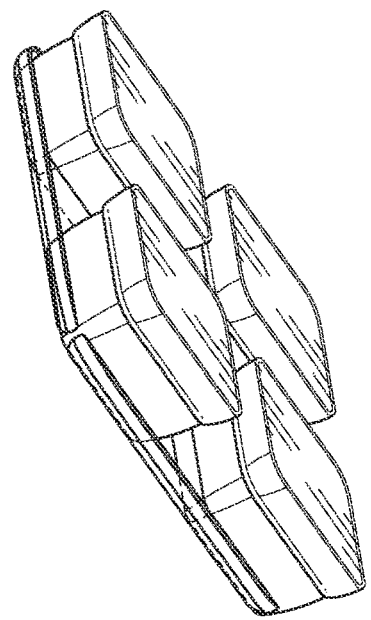
Figure 1C:
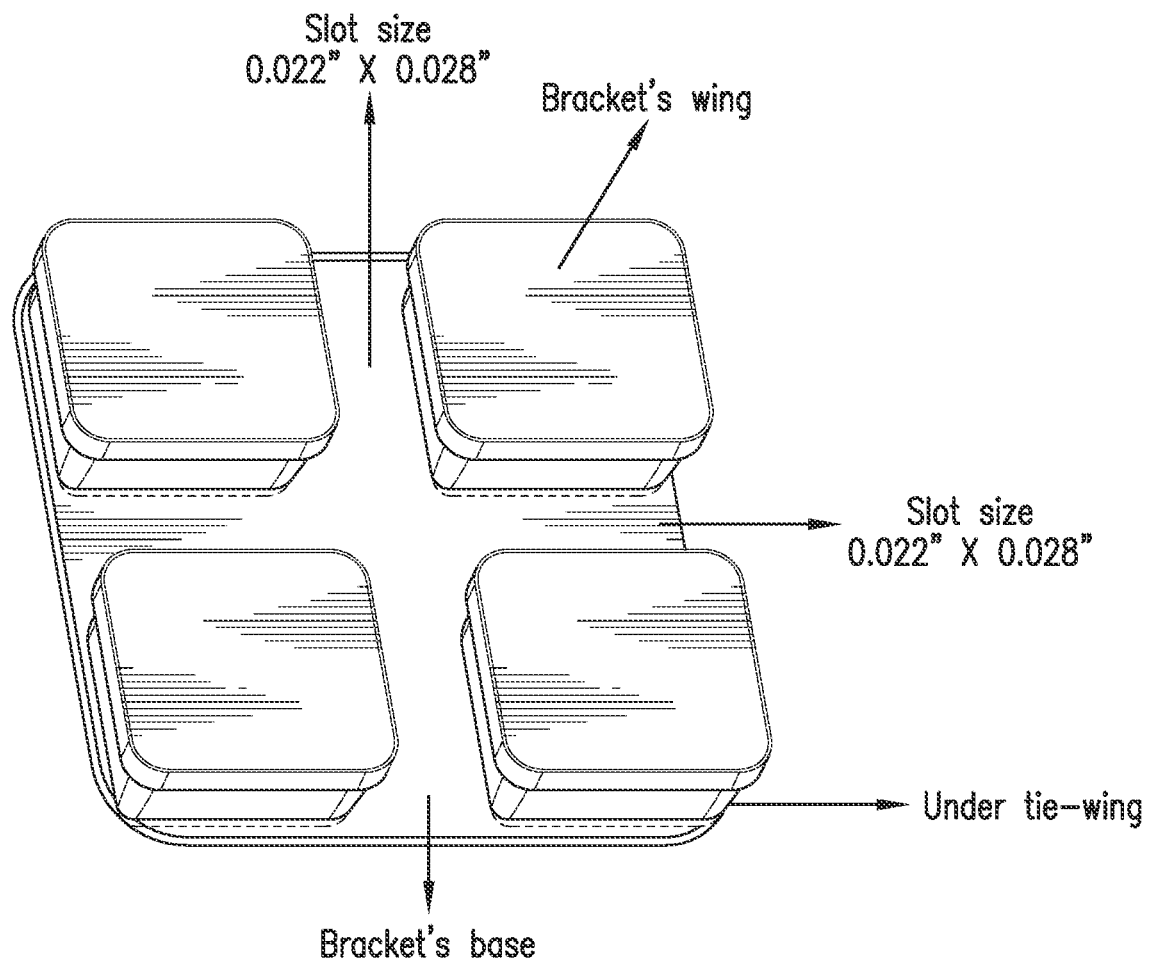
Figure 1D:
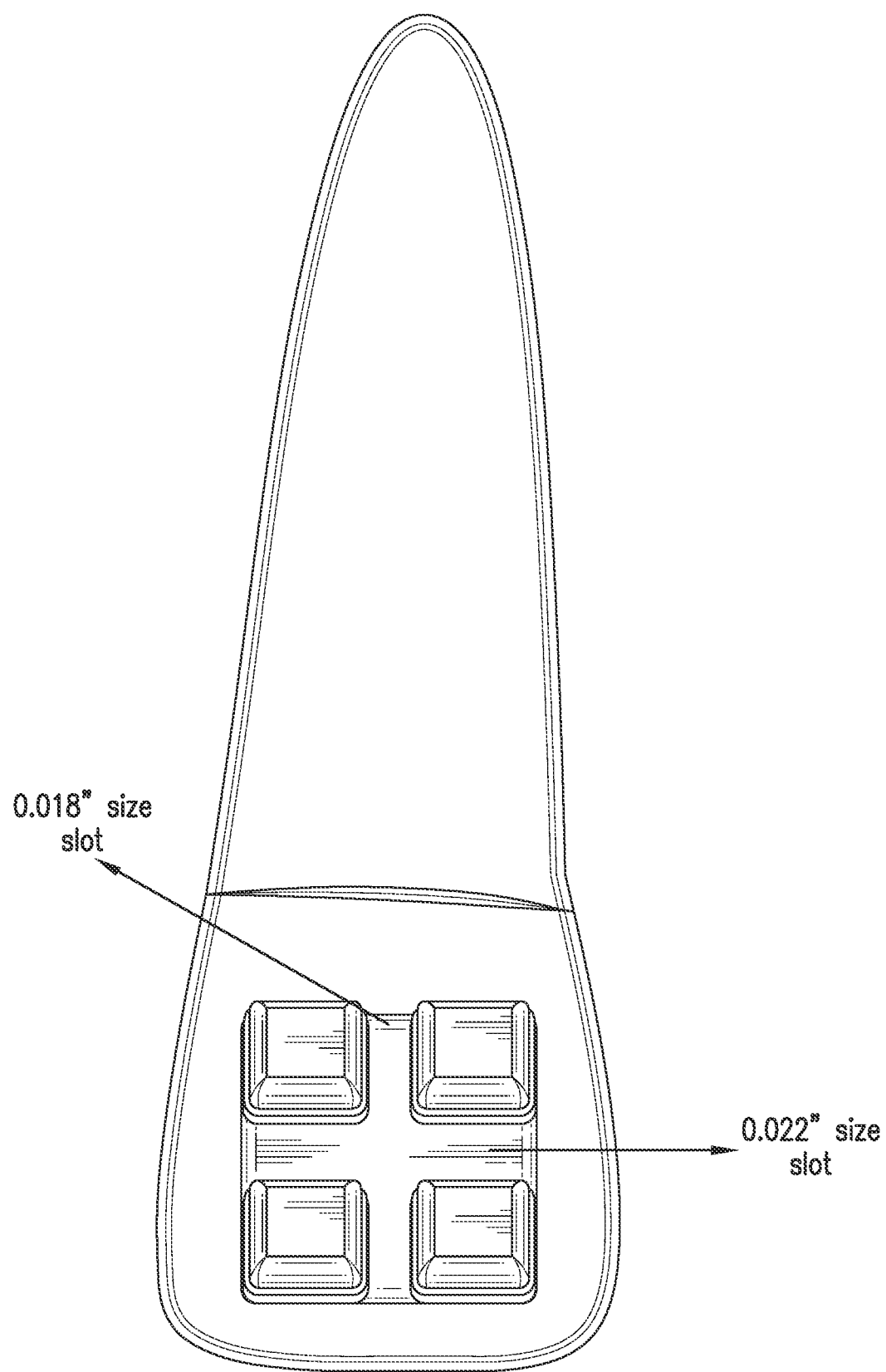
Figure 1E:
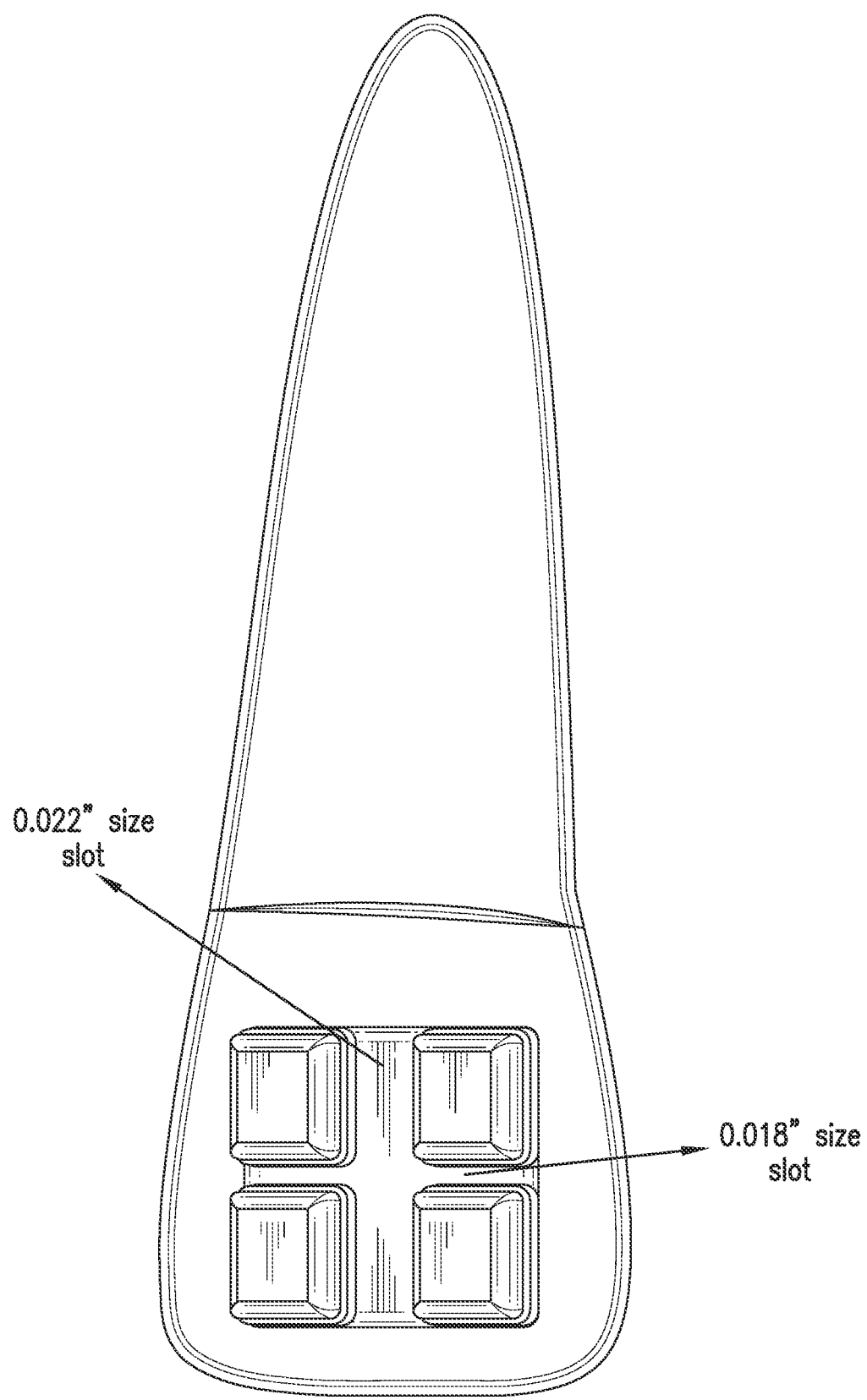
Figure 2A:
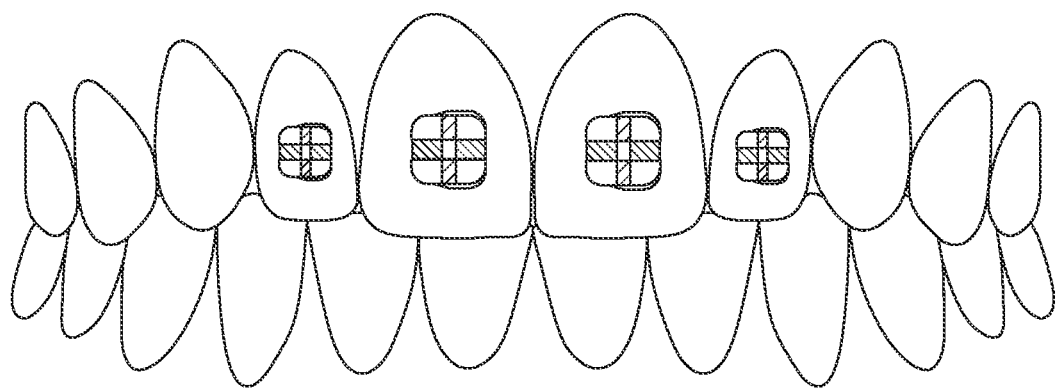
FIGS. 2A and B. Show different orientations of Hamad bi-slot brackets in place on teeth. A, teeth with exemplary Hamad bi-slot brackets oriented with a slot size 0.022 inches by 0.028 inches; B, teeth with exemplary Hamad bi-slot brackets oriented with a slot size 0.018 inches by 0.028 inches.
Figure 2B:
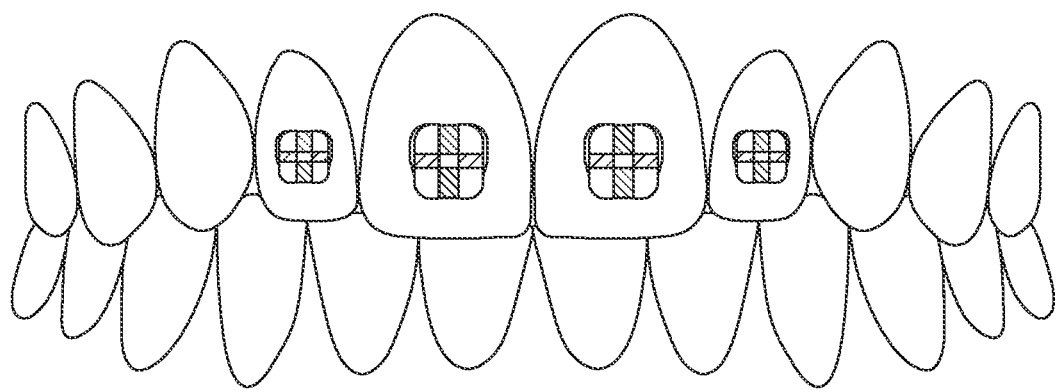

The two differently sized slots (recesses, channels, etc.) are present in/on the bracket face. Right angles are formed by the two differently sized slots and the bracket is easily switched between slot sizes by a 90° rotation of the whole bracket before bonding to the tooth surface. In other words, the slot size that is preferred or desired by the clinician at the time, or which is best suited for a particular tooth, can be oriented to select the desired slot size before bonding it into position. Thus, once bonded to a tooth, the desired slot of one size is horizontal with respect to the occlusal plane and can receive an archwire while the second slot, which is a different size, is not parallel but is positioned at a 90° angle and it can be used e.g. for easy removal of elastic ties. Or, upon a 90° rotation prior to bonding, the second slot becomes horizontal with respect to the occlusal plane and thus useable for archwire insertion, while the first slot has been rotated to be perpendicular to the occlusal plane to render it unusable for archwire insertion. This is illustrated in FIGS. 1D and 1E.

For each set of braces installed on the teeth of an individual patient, the slots may all be aligned the same way, or a mix of slots may be used by the orthodontist. For example, it may be advisable to use larger slots for posterior teeth, and smaller slots for anterior teeth, or vice versa; or to use slots of one size for the upper teeth and slots of a different size for lower teeth or vice versa; or a mixture of slots throughout; etc., as long as the archwires can be secured within the slots. All combinations of slot usage are encompassed herein.

For each slot, tip will be incorporated into the brackets face. Torque may be built into the bracket's face or base. Torque may be built into the bracket face (rather than the bracket base which attaches directly to a tooth) and is based on the tooth for which the bracket was designed, improving bracket adaptation on the tooth surface regardless of the slot selected size. In other words, the inner side walls and base of each slot will be angled in a certain way to deliver the proposed torque and tip values based on the prescription system used by the orthodontist. In other aspects, torque may be built into the bracket base to allow for the slots' level to line-up as recommended by Andrews [3]. This torque-in-base can be obtained by changing the angles of the bracket bases from 90 degrees to different obtuse and acute angles. The selection of torque-in-face vs torque-in-base specifications will depend on the brackets' manufacturer.

It is noted that there is no connecting part nor locking part between the bracket face and base. The whole system can be rotated before bonding to select the desired slot. Once bonding to the tooth surface is done, the bracket slot can not be changed unless the bracket is removed and replaced with another one with a different orientation for the bracket's slot.

In addition, each of the present brackets has a double wing design which incorporates four contoured tie-wings with rounded rectangular shapes to prevent tearing of the elastomeric tie during insertion and to provide comfort for the patient. FIGS. 1B and 1C show different views of a bracket with double tie wings. As can be seen, in this depiction, tie wings are part of and extend outward vertically from base, i.e. base and tie wings are molded as a single unit. Each tie wing has an "under tie-wing" area which facilitates brackets ligation with ligature wires or elastomeric ligatures.

Many different materials are known and can be used for the production of the brackets described herein. For example, the brackets may be made of metal (including mixed metals and metal alloys), ceramics and/or plastics (including, e.g., synthetic polymers). Examples include but are not limited to: stainless steel, gold-plated stainless steel (e.g. for subjects who are allergic to stainless steel), nickel-titanium, titanium, ceramics (which can be clear or tooth-colored).

Versatility of the Brackets

As noted above, the brackets disclosed herein are versatile via rotation of the whole bracket system in a clockwise or counterclockwise direction before its bonding to the tooth surface in order to select one of the two slot sizes present in the bracket face. Selection of the desired slot should be performed before the bracket is attached to a tooth, e.g. before the braces system is installed on the teeth of a subject. In other aspects, if the other slot is desired after the bracket is attached to a tooth or during the progress of the orthodontic treatment, the whole bracket should be removed and a new bracket with different orientation can be attached to the tooth. At any of these junctures, a clinician can select one desired slot size horizontally or a combination of different sizes based on the needs of the patient. In some aspects, all the selected slot sizes of all the brackets in a full set of braces comprising a plurality of brackets are the same. In other aspects, not all the slot sizes in a full set of braces are the same, i.e. the set includes two different (a mix) of slot sizes having a horizontal position. Similarly, a "set" of braces frequently, but not always, comprises a set of brackets for the upper teeth and a separate set of brackets for the lower teeth, and the most suitable slot sizes used for the upper set of brackets and the slot sizes used for the lower set of brackets may be the same or different from each other. The same applies to set of brackets for the teeth in the same arch by which the slot sizes used may be the same or different from each other for each tooth.

It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Representative illustrative methods and materials are herein described; methods and materials similar or equivalent to those described herein can also be used in the practice or testing of the present invention.

All publications and patents cited in this specification are herein incorporated by reference as if each individual publication or patent were specifically and individually indicated to be incorporated by reference, and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual dates of public availability and may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the invention has been described in terms of its several exemplary embodiments, those skilled in the art will recognize that the invention can be practiced with modification within the spirit and scope of the appended claims. Accordingly, the present invention should not be limited to the embodiments as described above but should further include all modifications and equivalents thereof within the spirit and scope of the description provided herein.

REFERENCES

1. Detterline D A, Isikbay S C, Brizendine E J, et al. Clinical outcomes of 0.018-inch and 0.022-inch bracket slot using the ABO objective grading system. Angle Orthod. 2010 May; 80(3):528-32.
2. El-Angbawi A M, Beam D R, McIntyre G T. Comparing the effectiveness of the 0.018-inch versus the 0.022-inch bracket slot system in orthodontic treatment: study protocol for a randomized controlled trial. Trials. 2014 Oct. 6; 15:389.
3. McLaughlin R P, Bennett J C. Evolution of treatment mechanics and contemporary appliance design in orthodontics: a 40-year perspective. American Journal of Orthodontics and Dentofacial Orthopedics. 2015 Jun. 1; 147(6):654-62

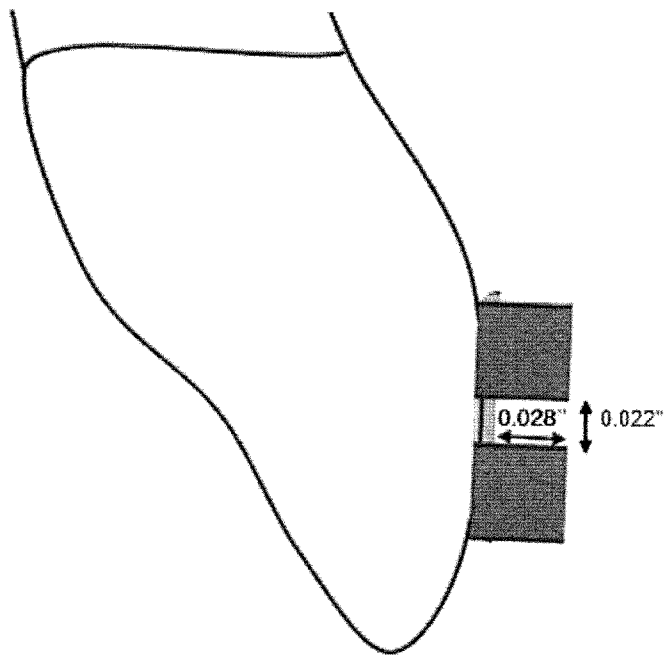

We claim:

1. A rotatable versatile orthodontic bracket, comprising
a bracket base configured to attach directly to a surface of a tooth in a first orientation or a second orientation; and
a bracket face comprising a first archwire slot having a first width and
a second archwire slot having a second width,
wherein
the first archwire slot and the second archwire slot are each configured to receive an archwire, and only one of the first archwire slot and the second archwire slot receives an archwire when the bracket is attached to the tooth in the first orientation or the second orientation; and wherein
the first archwire slot and the second archwire slot intersect at a 90° angle,
the first width and the second width are different, and
both slots have the same depth;
and wherein the first width is 0.018 inches and the second width is 0.022 inches;
and wherein the bracket face and the bracket base are molded as a single unit and there is no locking part between the bracket face and the bracket base;
and wherein the rotatable versatile orthodontic bracket comprises tie wings that are part of and extend vertically from the bracket base, wherein undercuts of the tie wings extend all the way around the tie wings.

2. The rotatable versatile orthodontic bracket of claim 1, wherein the first archwire slot and the second archwire slot each have a depth of 0.028 inches.

3. The rotatable versatile orthodontic bracket of claim 1, wherein the rotatable versatile orthodontic bracket further comprises at least four tie-wings.

4. The rotatable versatile orthodontic bracket of claim 3 wherein the four tie-wings are contoured and have under tie-wing areas.

5. The rotatable versatile orthodontic bracket of claim 1, wherein the rotatable versatile orthodontic bracket is made from metal, ceramic, or polymer.

6. A set of braces comprising
at least two rotatable versatile orthodontic bracket of claim 1.

7. A method for adjusting a position of at least one tooth of a patient, comprising:
i) selecting a slot size of the rotatable versatile orthodontic bracket as set forth in claim 1 for adjusting the position of the at least one tooth, wherein selecting comprises rotating the rotatable versatile orthodontic bracket to an orientation in which the desired slot is horizontal with respect to the occlusal plane of the patient; ii) adhering the bracket base directly to the at least one tooth of the patient, wherein the orientation is maintained during the step of adhering; iii) selecting an archwire or different archwires having a size that corresponds to the selected slot size; and iv) securing the archwire in the slot.

8. The method of claim 7, further comprising the step of replacing the rotatable versatile orthodontic bracket with a different rotatable versatile orthodontic bracket having a different orientation, wherein the step of replacing comprises,
removing the rotatable versatile orthodontic bracket from the at least one tooth;
performing steps i) to iv) using a different rotatable versatile orthodontic bracket.

* * * * *

UNITED STATES PATENT AND TRADEMARK OFFICE
CERTIFICATE OF CORRECTION

PATENT NO. : 11,202,692 B1  
APPLICATION NO. : 17/106820  
DATED : December 21, 2021  
INVENTOR(S) : H. Alqahtani et al.

Page 1 of 2

It is certified that error appears in the above-identified patent and that said Letters Patent is hereby corrected as shown below:

In the Drawings

Please replace Figure 1C, also on the title page, the print Figure, with the following:

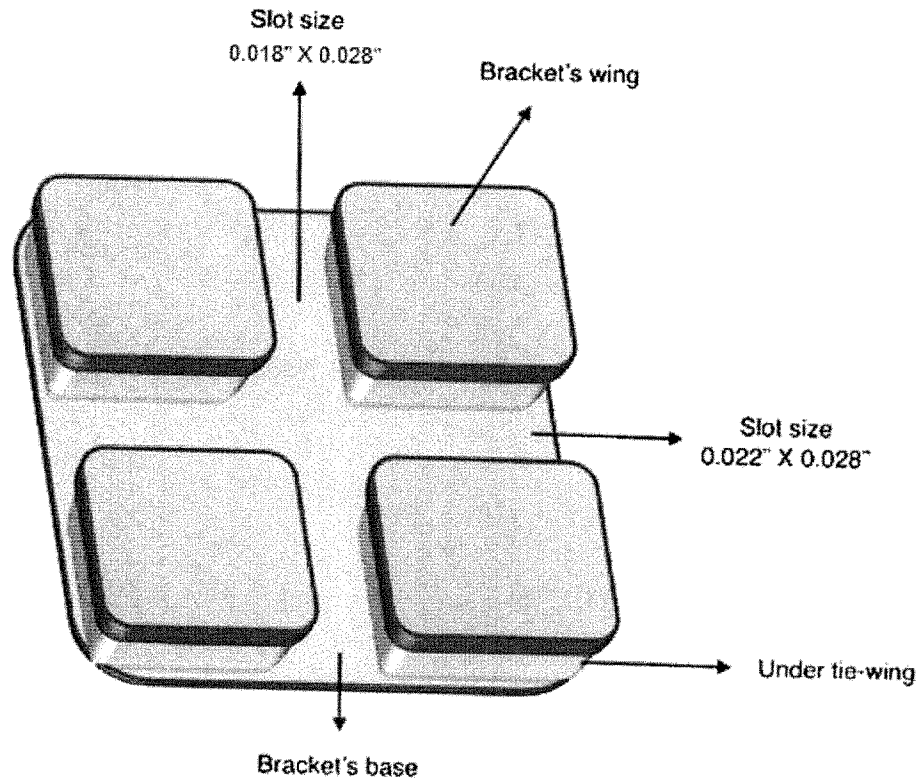

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 11,202,692 B1

Figure 3A:
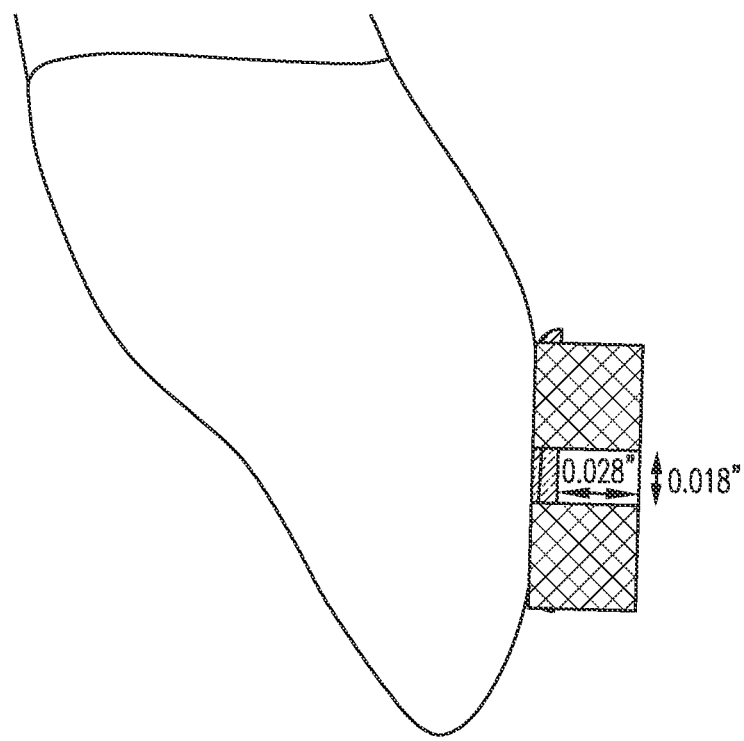
FIG. 3A-B. Showing lateral view of a tooth with bonded bracket to show the slot's dimensions of A, 0.018"×0.028"; B, 0.022"×0.028".
Figure 3B:
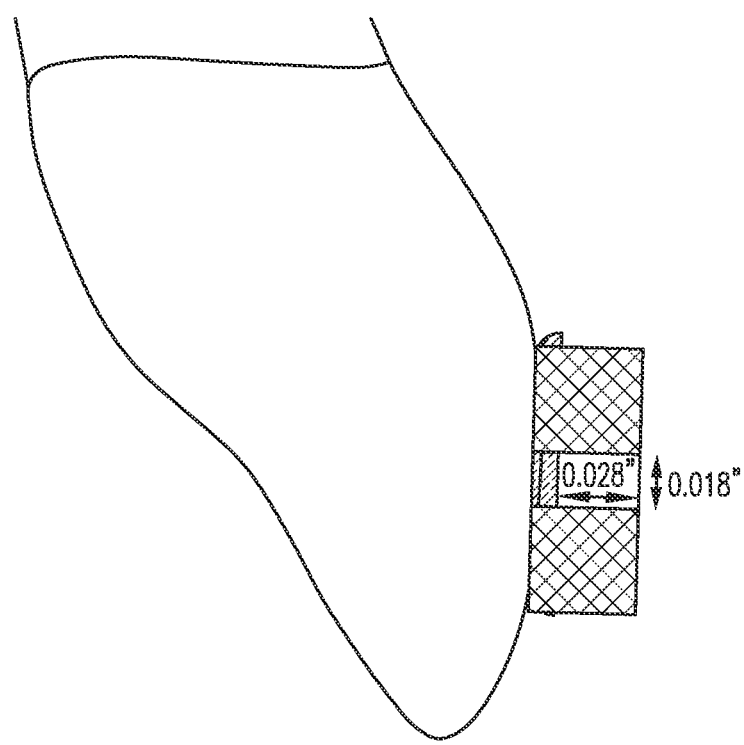

Please replace Figure 3B with the following: